Figure 3:
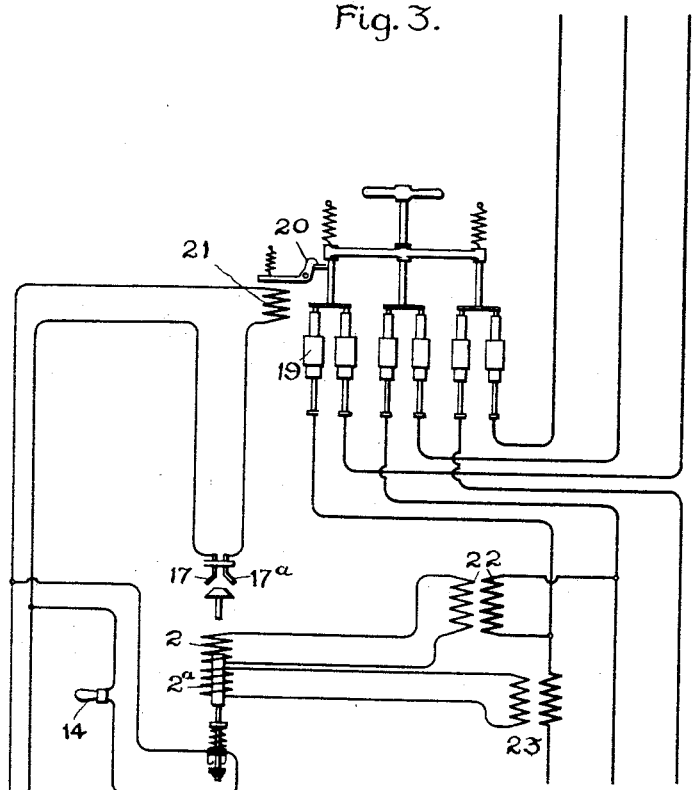

No. 697,144. Patented Apr. 8, 1902.
E. M. HEWLETT.
CIRCUIT CONTROLLER.
(Application filed Sept. 9, 1901.)
(No Model.) 2 Sheets—Sheet 1.
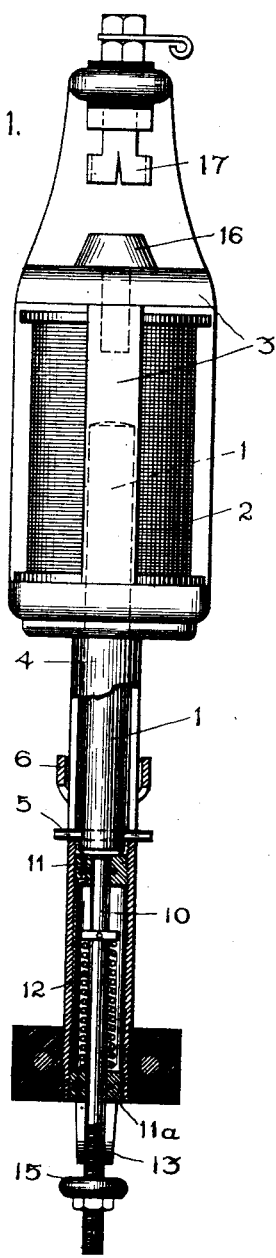
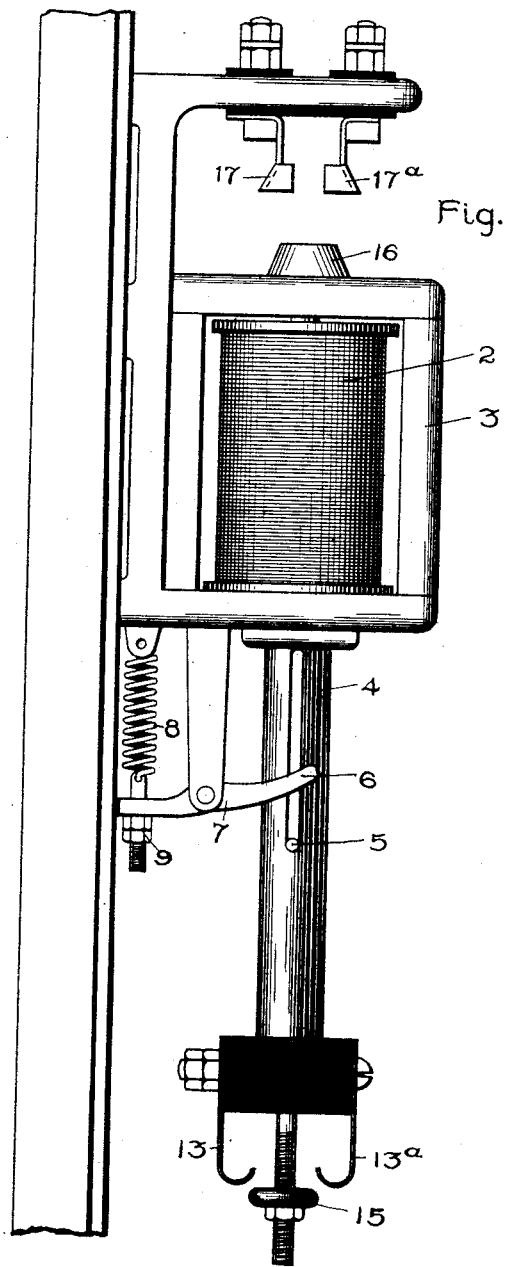
Witnesses.
Ewing R. Gurney
Benjamin B. Hull
Inventor.
Edward M. Hewlett.
by Albert G. Davis
Atty.

UNITED STATES PATENT OFFICE.

EDWARD M. HEWLETT, OF SCHENECTADY, NEW YORK, ASSIGNOR TO GENERAL ELECTRIC COMPANY, A CORPORATION OF NEW YORK.

CIRCUIT-CONTROLLER.

SPECIFICATION forming part of Letters Patent No. 697,144, dated April 8, 1902.

Application filed September 9, 1901. Serial No. 74,715. (No model.)

*To all whom it may concern:*

Be it known that I, EDWARD M. HEWLETT, a citizen of the United States, residing at Schenectady, county of Schenectady, State of New York, have invented certain new and useful Improvements in Circuit-Controllers, (Case No. 2,331,) of which the following is a specification.

In controlling electric circuits it is frequently desirable to have an instrument which will respond to different strengths of current to govern the action of other circuits which it controls when certain predetermined conditions arise in the circuit in which it is included. For example, in operating automatic circuit-breakers there is often provided means for operating the circuit-breaker at two or more load conditions, a timing device commonly being provided for the lower load condition, so that the circuit will be opened if a moderate overload prevails for a certain length of time, but will be instantly opened if a higher and dangerous strength of current, such as would be produced by a short circuit, should occur. It is also often necessary or advisable, particularly on alternating-current circuits, to have the circuit opened in case of a reversal of energy flow, as when a number of generators are connected in parallel with a common set of bus-bars or when a distributing-circuit includes storage batteries or rotary converters. In such cases any condition which would permit a backflow of current through a generator which is out of phase or from a storage battery in case there is a short circuit on the alternating mains would lead to disastrous results, and devices known in the art as "reverse-current" relays are provided which open the circuit under a backflow of energy. The type of circuit-controller embodied in my present invention is well adapted for such uses. The instrument comprises an operating coil or coils, the armature of which is provided with a relatively easier path of movement during a limited part of its throw, and a local circuit closed at the end of the preliminary range of movement, including a signaling device to direct attention to an overload condition of the circuit. The armature is still free to move, though it requires an increased pull, and in case of a predetermined maximum current will close another circuit which trips an automatic circuit-breaker and opens the circuit or cuts out an apparatus controlled by the instrument. When applied to use as a reverse-current relay, I provide the instrument with two coils differentially wound, so that in case of reversal they will act summatively to open the circuit, or in case of a definite overload the series coil will overpower the potential-coil sufficiently to operate the signaling device.

The invention also embodies specific features of construction, the novelty of which will be hereinafter fully described, and definitely indicated in the claims.

Figure 4:
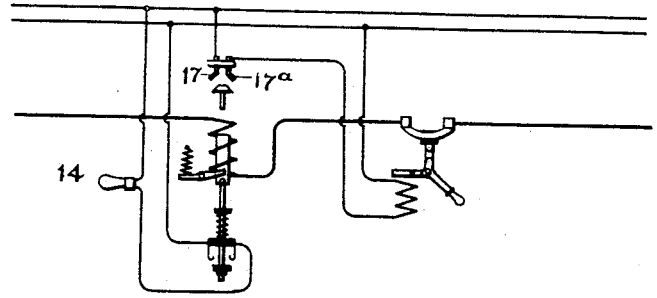

In the accompanying drawings, which illustrate the invention, Figures 1 and 2 are a front elevation, partly in section, and a side elevation, respectively, of an instrument embodying my improvements. Fig. 3 is a diagrammatic illustration of a high-potential alternating-current circuit protected by a reverse-current relay embodying my improvements, and Fig. 4 is a diagram of an automatic circuit-breaker controlled by the instrument.

Referring first to Fig. 1, 1 represents an iron core, which may be formed of a single piece of iron when adapted for direct current or of a bundle of iron wires or plates when adapted for alternating current. This is mounted for vertical movement in a coil or coils 2, supported in an iron frame 3. Extending from the bottom of the frame is a brass or other non-magnetic tube 4, slotted for a portion of its length to permit movement of a pin 5, secured in the lower end of the core. In the path of movement of the pin is a forked arm 6 of lever 7, pivoted on a standard depending from the frame, the other end of which is connected with a helical spring 8. The tension of the spring may be varied, by means of an adjusting-screw 9, to vary the tripping-point of the circuit-breaker. In the lower part of the tube 4 is a plunger 10, guided in nuts 11 11$^a$ and normally pressed upward by a coil-spring 12 of a tension weak enough to be overcome by the weight of the core 1. Contact-springs 13 13$^a$ are mounted on an insulating-piece secured to the bottom of the tube and may be connected with a local circuit, including a lamp or other signaling device, as indicated at 14 in Fig. 4. The contact-springs 13 13ª are in a position to be bridged by a metal bridge-piece 15, carried on the lower end of the rod 10. This is normally held out of contact with the springs by the weight of the core 1; but when the latter is lifted by the influence of its controlling coil or coils the tension of the spring 12 lifts the rod 10 and bridges the contacts 13 13ª. The coils are of such proportions that this result will be effected on a determinate degree of overload in the circuit into which the coil or coils are inserted—say twenty-five per cent. above the normal load-current—and thus the operator will be warned of the condition of the circuit, and if it endures for a dangerous length of time he may open it or otherwise provide for its safety. The operating-coils may be included directly in the circuit or may be derived therefrom in the case of an alternating-current circuit by means of transformers in a manner well known to those skilled in the art. Suspended over the open end of the coil or coils 2 is a movable bridge-piece 16, adapted to cross-connect two insulated contacts 17 17ª, connecting with a circuit-breaker in the controlled circuit, as will be evident from Figs. 3 and 4. This bridging contact is provided with a stem at its bottom, which projects into the core of the coil, so as to be struck by the latter and brought into contact with the points 17 17ª in case of a maximum overload—say a one hundred per cent. above the normal overload. Thus it will be evident that a definite degree of overload will give a signal, as by the lamp 14, to warn the attendant, and an immediately-dangerous condition will bridge the contacts 17 17ª and trip the circuit-breaker in the control-circuit. The trip-coil may be fed from a local circuit or any suitable source, the switch-contacts of the circuit-breaker being in series directly or inductively with the operating-coil of the relay instrument, as usual in the art and as indicated in the drawings.

In Fig. 3 the instrument is shown as adapted for use with a reverse-current relay. A three-phase circuit is shown, in which is interposed a high-potential switch, such as an oil-switch having a double-pole break for each phase, as indicated at 19. This is held closed by a latch 20, which may be tripped by the trip-coil 21 in a local circuit including the contacts 17 17ª. The operating-coils of the relay instrument are differential, as indicated at 2 2ª, the former being supplied from a potential-transformer 22 and the latter from a current-transformer 23. Thus in case of a definite overload the current-coil will overpower the potential-coil and the lamp will be lighted, and in case of a maximum current it will overpower it sufficiently to overcome the tension of the spring 8, thereby bridging contacts 17 17ª and tripping the circuit-breaker. In case of a reversal of energy flow the current-coil will assist instead of opposing the potential-coil, and the combined energy of both coils will be exerted on the movable core, thereby bridging the contacts 17 17ª and opening the circuit. It will be evident that by a proper proportioning of the coils when the device is used for a reverse-current relay the circuit-breaker may be opened upon a determinate maximum current and that an indication may be given upon a small percentage of reverse current, and that the circuit-breaker may be tripped upon a determinate higher strength of reverse current, thus opening the circuit upon excessive-current conditions for either direct or reverse current flow and indicating a weaker reverse-current flow.

Having thus described my invention, what I claim as new, and desire to secure by Letters Patent of the United States, is—

1. The combination with a circuit-breaker, of an electroresponsive device controlling the same responsive to different line conditions, connections for actuating the circuit-breaker under one line condition, and a signal operated by another line condition.

2. The combination with an automatic circuit-breaker, of tripping mechanism for operating the same upon a maximum overload, and a signal operated thereby upon a determinate load less than the maximum.

3. The combination with a circuit-breaker, of an electromagnetic device for tripping the same, means for increasing the retractile force of the armature of said device after a determinate range of movement, and an auxiliary circuit controlled during such range of movement.

4. A circuit-controller comprising a magnet, a local circuit actuated by a determinate range of armature movement, a retractile force put in action after such range of movement, and another local circuit closed by a further range of armature movement.

5. A circuit-controller comprising an operating-coil, a movable core, a signal-circuit closed by a determinate range of core movement, a retractile spring normally disengaged but engaged by the core after a determinate range of movement, and a tripping-circuit for a circuit-breaker actuated by a further range of armature movement.

6. A circuit-controller comprising an operating-coil, a movable core, a slotted supporting-tube in alinement with the coil-axis, and a retractile agent engaged by an extension of the core through the slot.

7. A circuit-controller comprising an operating-coil, a movable core, a slotted supporting-tube in alinement with the coil-axis, an extension of the core projecting through the slot, and a retractile agent engaged by the extension after a determinate range of core movement.

8. A circuit-controller comprising an operating-coil, a movable core, a tripping device operated by a full range of core movement, and a spring-depressed circuit-closer normally engaged by the core and released by a partial range of core movement.

9. A circuit-controller comprising an operating-coil, a movable core, an inclosing tube for the latter in alinement with the coil-axis, a stop supporting the core within the grasp of the coil, a trip device for a circuit-breaker movably supported at the top of the coil, insulated contacts for a local circuit on the bottom of the tube, and a spring-pressed bridge-piece to connect the contacts after the core has made a partial traverse.

10. The combination with a circuit-breaker, of an electroresponsive device controlling the same provided with differential coils, an indicator controlled by the coils upon a determinate strength of current-reversal, and means for tripping the circuit-breaker upon a determinate excess of current in either coil.

In witness whereof I have hereunto set my hand this 4th day of September, 1901.

EDWARD M. HEWLETT.

Witnesses:
C. E. EVELETH,
G. C. HOLLISTER.